United States Patent
Lee et al.

(10) Patent No.: US 8,890,888 B2
(45) Date of Patent: Nov. 18, 2014

(54) METHOD AND SYSTEM FOR SHARING LOCATION INFORMATION AND RECORDING MEDIUM USING THE SAME

(75) Inventors: Yu-Cheng Lee, Taoyuan County (TW); John C. Wang, Taoyuan County (TW)

(73) Assignee: HTC Corporation, Taoyuan County (TW)

(*) Notice: Subject to any disclaimer, the term of this patent is extended or adjusted under 35 U.S.C. 154(b) by 1074 days.

(21) Appl. No.: 12/690,055

(22) Filed: Jan. 19, 2010

(65) Prior Publication Data

US 2010/0182341 A1 Jul. 22, 2010

(30) Foreign Application Priority Data

Jan. 21, 2009 (TW) ............................... 98102314 A (51) Int. Cl.
G09G 5/00 (2006.01)
G06F 17/30 (2006.01)

(52) U.S. Cl.
CPC .... G06F 17/30044 (2013.01); G06F 17/30056 (2013.01); G06F 17/30061 (2013.01); G06F 17/30241 (2013.01)
USPC .......................................... 345/619; 345/418

(58) Field of Classification Search
CPC ................ G09G 5/14; G09G 2340/10; G09G 2340/125; G06T 19/00; G06T 19/006; H04N 5/272
USPC ..................... 345/418; 709/219; 707/999.001, 707/999.003
See application file for complete search history.

(56) References Cited

U.S. PATENT DOCUMENTS

| | | | |
|---|---|---|---|
| 6,161,131 A | 12/2000 | Garfinkle | |
| 7,475,060 B2* | 1/2009 | Toyama et al. | 707/999.003 |
| 2004/0078750 A1* | 4/2004 | Frank | 715/500 |
| 2004/0225635 A1* | 11/2004 | Toyama et al. | 707/1 |
| 2005/0027814 A1* | 2/2005 | Norman et al. | 709/219 |
| 2006/0114514 A1 | 6/2006 | Rothschild | |
| 2010/0185391 A1* | 7/2010 | Lee et al. | 701/208 |
| 2011/0283223 A1* | 11/2011 | Vaittinen et al. | 715/781 |
| 2012/0203460 A1* | 8/2012 | Cho et al. | 345/632 |
| 2013/0346916 A1* | 12/2013 | Williamson et al. | 345/629 |

FOREIGN PATENT DOCUMENTS

| | | |
|---|---|---|
| CN | 1662087 | 8/2005 |
| CN | 101188656 | 5/2008 |
| CN | 101237637 | 8/2008 |
| CN | 101311678 | 11/2008 |
| EP | 1950984 | 7/2008 |

(Continued)

OTHER PUBLICATIONS

"Office Action of Taiwan counterpart application" issued on Oct. 17, 2012, p. 1-p. 10.
"First Office Action of China counterpart application" issued on Jun. 4, 2012, p. 1-p. 7.

(Continued)

*Primary Examiner* — Chante Harrison
(74) *Attorney, Agent, or Firm* — Jianq Chyun IP Office (57) ABSTRACT

A method and a system for sharing location information and a recording medium using the same are provided. The present method obtains graphic location information by a first display software, and insert the document to a document corresponding to a second display software. The document is then transmitted to a remote device. Accordingly, through reading the document, the remote device can directly activate the applicable display software to display the graphic location information originally shared by the user of the mobile device.

20 Claims, 6 Drawing Sheets

(56) References Cited

FOREIGN PATENT DOCUMENTS

| | | |
|---|---|---|
| EP | 1950984 A1 | 7/2008 |
| FR | 2849312 | 6/2004 |
| TW | 200418291 | 9/2004 |
| TW | 200418306 | 9/2004 |
| TW | 200419368 | 10/2004 |
| WO | 02098148 | 12/2002 |
| WO | 02098148 A2 | 12/2002 |

OTHER PUBLICATIONS

"Search Report of Europe Counterpart Application" issued on May 7, 2010, p. 1-p. 3.

"Office Action of Europe Counterpart Application" issued on Jun. 1, 2010, p. 1-p. 6.

"Fourth Office Action of China Counterpart Application", issued on Oct. 23, 2013, p. 1-p. 5.

* cited by examiner

METHOD AND SYSTEM FOR SHARING LOCATION INFORMATION AND RECORDING MEDIUM USING THE SAME

CROSS-REFERENCE TO RELATED APPLICATION

This application claims the priority benefit of Taiwan application serial no. 98102314, filed on Jan. 21, 2009. The entirety of the above-mentioned patent application is hereby incorporated by reference herein and made a part of specification.

BACKGROUND

To keep up with the bustling pace of modern human life, a variety of mobile devices which are readily portable and compact have also flourished. Conventional mobile devices, for example a personal digital assistant (PDA), may insert information, such as articles, music, or photos to be sent in a document in specific format and transmit the document to a remote device through sending an e-mail, a short message service (SMS), or a multimedia messaging service (MMS), so as to share the information with the users at a remote end.

However, because there are variations in techniques and properties of the products manufactured by different manufactures, specifications of software and hardware of the products are not the same or similar. In this case, if the mobile device utilizes its own display software to display graphic location information which comprises the photo and the information related with a point of interest (POI), a receiving end must support the same display software in order to view exactly the same graphic location information. If the receiving end does not support the same display software, the receiving end might not be able to display the graphic location information, or might display only the texts related to the graphic location information transmitted from the mobile device.

Therefore, it is necessary to provide other alternatives for the users' options, in order to adaptively convert the graphic location information into document formats which are supported or can be opened by various remote devices, such that the users of the remote devices may open the document and view the graphic location information in the format that originally shared by the user of the mobile device.

SUMMARY

The present application is directed to a method for sharing location information, so as to insert the graphic location information into a selected document and transmit the document to a remote device to share the graphic location information.

The present application is directed to a system for sharing location information, so as to insert a specific part of the graphic location information into corresponding fields of a multimedia document in a postcard format, such that a user at a remote end may directly view the multimedia document containing the graphic location information.

The present application provides a method for sharing location information, so as to enable a mobile device to share graphic location information with a remote device, wherein the method comprises obtaining the graphic location information by a first display software, inserting the graphic location information into a document corresponding to a second display software, and then transmitting the document to the remote device.

According to one example of the present application, the step of inserting the graphic location information into the document corresponding to the second display software comprises receiving a selection instruction to select the document which can be opened by the second display software to insert the graphic location information into the document.

According to one example of the present application, the step of inserting the graphic location information into the document corresponding to the second display software comprises using a reverse-geocoding method to convert the location information into an address, and then inserting the address into the document with photo. Converting the location format into address or latitude and longitude is depending on the purpose for sending it to remote device.

According to one example of the present application, after the step of transmitting the document to the remote device, the remote device uses a geocoding method to convert the address into a longitude and latitude and connects the internet to display a online electronic map indicating the location of the longitude and latitude.

According to one example of the present application, the remote device may use a geocoding method to convert the location information into a longitude and latitude and insert the longitude and latitude into the document.

According to one example of the present application, further the step of transmitting the document to the remote device, the remote device further uses a reverse-geocoding method to convert the longitude and latitude into an address.

According to one example of the present application, the step of selecting the document corresponding to the second display software to insert the graphic location information into the document comprises filling the graphic location information in the corresponding fields in a uniform resource locator (URL) address of an online electronic map, and inserting the URL address into the document, wherein the document is for the remote device to reads the URL address inserted in the document, connect the URL address on the internet, and then display the information on online electronic map.

According to one example of the present application, after the document is received by the remote device, the remote device reads the URL address inserted in the document, connects the URL address on the internet, and then displays the information on online electronic map.

According to one example of the present application, the step of inserting the graphic location information into the document corresponding to the second display software comprises opening a online electronic map according to the location information with photo, and saving the online electronic map as a single document in a hypertext markup language (HTML) format.

According to one example of the present application, the step of inserting the graphic location information into the document corresponding to the second display software comprises producing a multimedia document according to a postcard format and correspondingly filling the graphic location information in the fields in the postcard format, wherein the multimedia document comprises a multimedia messaging service (MMS) message, an image file, e.g. a Joint Photographic Experts Group (JPEG) file, or a HTML file.

According to one example of the present application, after the step of inserting the graphic location information into the document corresponding to the second display software, a tag is further added to a header of the document for indicating the second display software which can open the document, wherein the tag in the header is for the remote device to read and then select the proper display software to open the document and display the graphic location information on the remote device.

According to one example of the present application, after the document is received by the remote device, the remote device reads the tag in the header of the document, so as to select the proper display software to open the document and display the graphic location information on the remote device.

According to one example of the present application, the graphic location information comprises data of a point of interest, comprising any of a name, a longitude and latitude, an address, a telephone number, a photo, a date of the photo being taken, time, a map image, a text file, an audio file, a video file, and a rating (e.g. a rating of recommendation), or a combination thereof, wherein the format of the document comprises an e-mail format, a short message service (SMS) format, an MMS format, a keyhole markup language (KML) format, a Keyhole Markup Zip file (a KMZ (a group of KML)) format, a HTML format, a JPEG format, or special formats such as a vCard-like format (a format similar to a vCard format).

The present application provides a method for sharing location information, so as to enable a mobile device to share graphic location information with a remote device, the method comprises obtaining the graphic location information, producing a multimedia document according to a postcard format, correspondingly filling the graphic location information in the fields in the postcard format, and transmitting the multimedia document to the remote device, wherein the multimedia document comprises a MMS message, an image file (for example a JPEG file), an e-mail, a KMZ, or a HTML file.

The present application provides a system for sharing location information, which is disposed in a mobile device. The system comprises a location information acquisition module, a location information insertion module, and a transmitting unit. The location information acquisition module obtains graphic location information by a first display software. The location information insertion module inserts the graphic location information into a document corresponding to a second display software. The transmitting unit transmits the document to a remote device.

According to one example of the present application, the system further comprises a camera capture module for obtaining photo or video by shooting the material which is desired to share or store.

According to one example of the present application, the system further comprises an audio recording module for obtaining audio file by recording a short description of the sharing or storing information.

According to one example of the present application, the location information, for example the latitude and longitude information, of the graphic location information may be acquired by GPS positioning, WiFi positioning, Cell tower positioning, or picking the location form an electronic map.

The present application provides a system for sharing the location information, which is disposed in a mobile device. The system comprises a location information acquisition module, a postcard production module, and a transmitting unit. The location information acquisition module obtains the graphic location information by a first display software. The postcard production module produces a multimedia document according to a postcard format and correspondingly filling the graphic location information in the fields in the postcard format. The transmitting unit transmits the multimedia document to a remote device. The multimedia document comprises a MMS message, KMZ, e-mail, JPEG or a HTML file.

The present invention further provides recording media, which records a computer program to be loaded into an electronic device for executing the methods for sharing the location information. The recording media are constituted of a plurality of program code segments, such as program code segments of creating organization chart, signing forms, configuration, and deployment. Then, when the program code segments are loaded into the electronic device and executed, the steps of the method for sharing the location information and functions of the system for sharing the location information are executed.

In light of the foregoing, the methods and the systems for sharing the location information and the recording media using the same extract specific information from the graphic location information according to the document formats supported by the display software selected by the user, and insert the specific information into the selected document. Therefore, the users at the remote end may directly execute the corresponding display software to view the graphic location information originally shared by the user of the mobile device by reading the document.

In order to make the aforementioned and other objects, features and advantages of the present application more comprehensible, several examples accompanied with figures are described in detail below.

BRIEF DESCRIPTION OF THE DRAWINGS

The accompanying drawings are included to provide a further understanding of the application, and are incorporated in and constitute a part of this specification. The drawings illustrate examples of the application and, together with the description, serve to explain the principles of the application.

DESCRIPTION

To enable a user at a remote end to see graphic location information originally displayed by a particular display software, the present application inserts some information of the graphic location information into a document which can be opened by a remote device or by an ordinary mobile device before sending the graphic location information, and then transmits the document in which the graphic location information is inserted to the remote device. Thereby, even if the remote device does not support the particular display software, the remote device may normally display the graphic location information originally shared by the mobile device.

Figure 1:
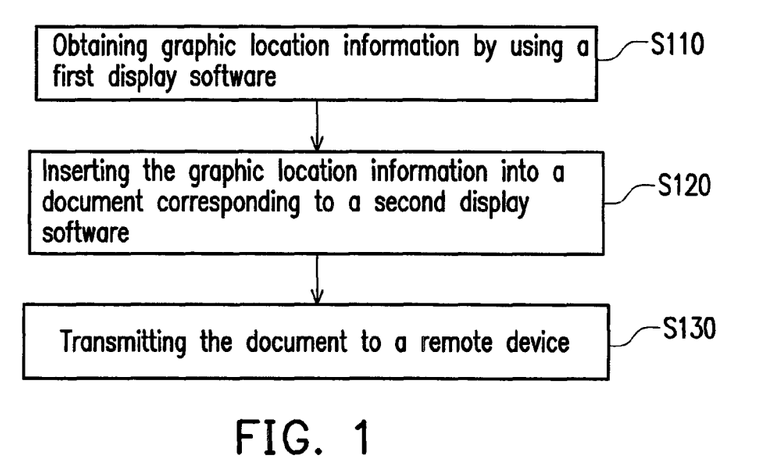
FIG. 1 is a flowchart illustrating a method for sharing location information according to one example of the present application.

FIG. 1 is a flowchart illustrating a method for sharing location information according to one example of the present application. Referring to FIG. 1, the example of the present application may be applied to mobile devices, such as a mobile phone, a smart phone, a PDA phone, a multimedia player, a game device, a navigation device, or a car PC, for sharing the graphic location information of the mobile device with a remote device, such that a user of the remote device may view the shared graphic location information. The method comprises steps as follows.

First, a first display software is used to obtain the graphic location information (step S110). The first display software may, for example, integrate an image or a photo and related information of a point of interest (POI) into a POI collection, and the POI collection may be, for example, in a format similar to a phone directory. Each page or each item in the POI collection represents one POI, and may record the graphic location information of the POI comprising a name, a longitude and latitude, an address, a telephone number, a photo, a date of the photo being taken, time, a map image, a text file, an audio file, a video file, or a rating related to the POI.

Figure 2A:
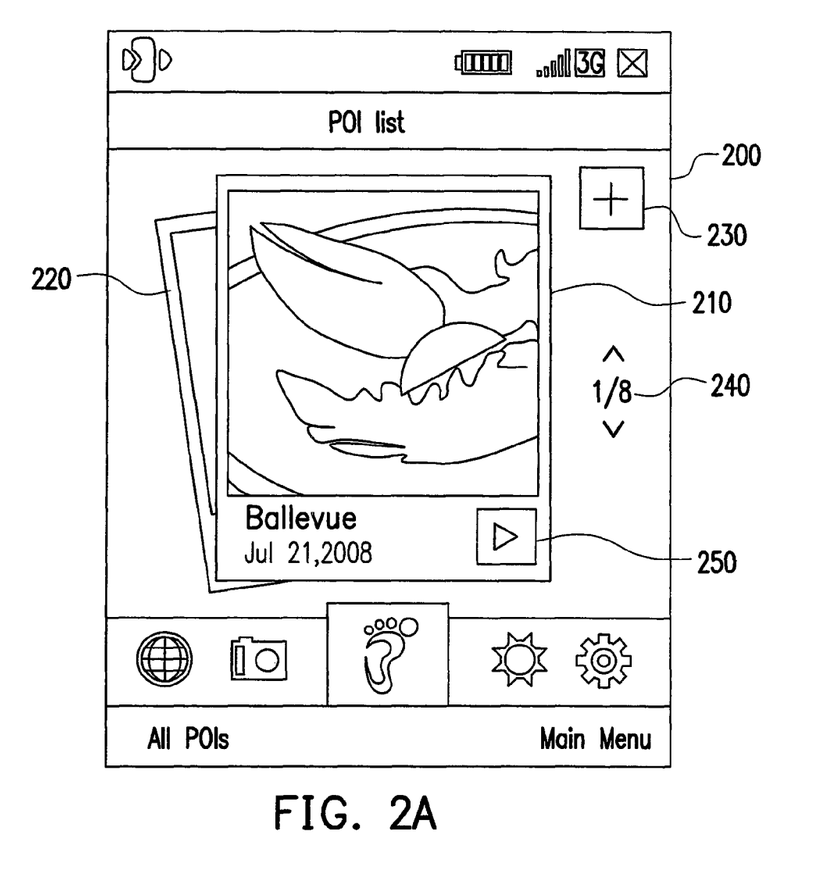
FIGS. 2A and 2B exemplify the display software according to one example of the present application.
Figure 2B:
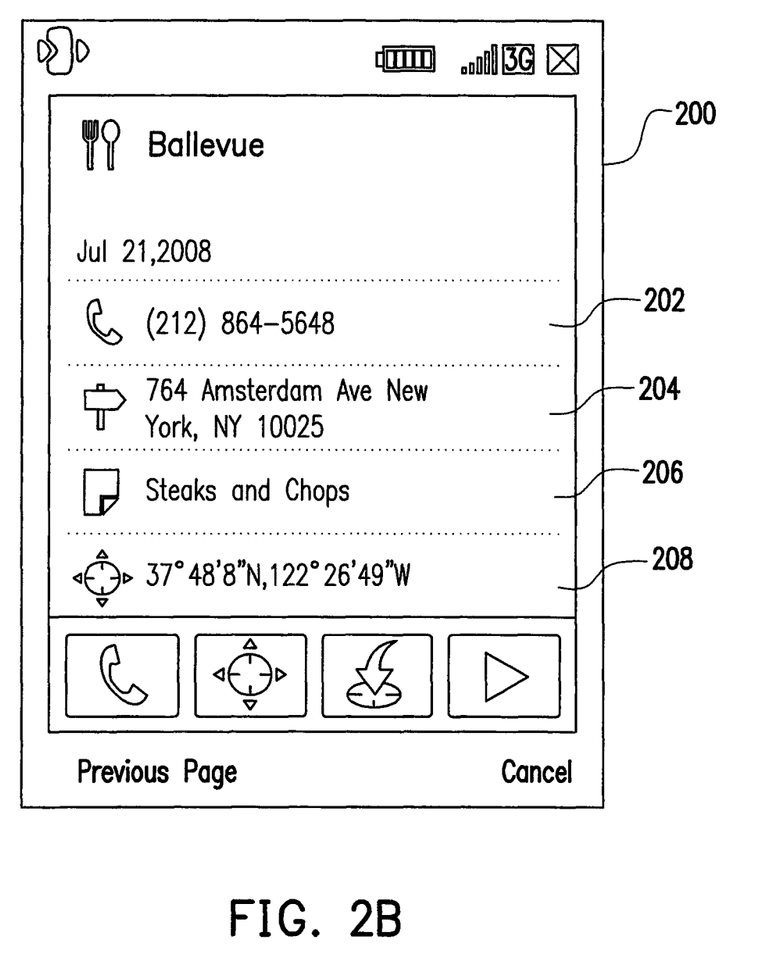

FIGS. 2A and 2B exemplify the display software according to one example of the present application. Referring to FIG. 2A, a user interface 200 of the display software includes POI pages 210 and 220, an addition button 230, and a switch button 240. The POI page 210 displays data of the POI including, for example, the name, the photo, and the date of the photo being taken. The user may select the addition button 230 on the user interface 200 to add a new POI page into the POI collection. Then, referring to FIGS. 2A and 2B at the same time, if the user selects a button 250 in the POI page 210, the user interface further displays other information of the POI, such as a telephone number 202, an address 204, a text description 206, and a longitude and latitude 208.

Next, the mobile device inserts the graphic location information into a document corresponding to a second display software (step S120). For example, the mobile device receives a selection instruction of the user to select the document which can be opened by the second display software to insert the graphic location information.

After the graphic location information is inserted to the document, the mobile device transmits the document to the remote device (step S130), and the user of the remote device may view the same graphic location information originally shared by the user of the mobile device by simply selecting/opening the document. In other words, the document may be easy to read by the receiver and the receiver may read the same graphical location information that shared by the user.

In one example, if the remote device is capable of surfing the internet and equipped with an internet browser, and the graphic location information obtained by the mobile device comprises the longitude and latitude, the mobile device may use a reverse-geocoding method to convert the longitude and latitude into an address, insert the address into the document, and then transmit the document to the remote device. For example, the mobile device may transmit the longitude and latitude of its location to an internet location server to query and obtain an actual address corresponding to the longitude and latitude, and thereby insert the actual address into the document. In on example, after the remote device receives the document, the receiver may directly read the actual address information. In another example, after the remote device receives the document actual address information, the remote device may use a geocoding method to convert the address in the document back to the longitude and latitude, and then, according to the longitude and latitude, connects the internet to display an online electronic map indicating the location of the longitude and latitude. Likewise, the mobile device may use the geocoding method to convert the actual address into the longitude and latitude, insert the longitude and latitude into the document, and transmit the document to the remote device.

According to another example, if the remote device is capable of surfing the internet and equipped with the internet browser, the mobile device may extract required information (e.g. the longitude and latitude, a scale of a map, and display dimensions of the POI) to fill in the corresponding fields in a uniform resource locator (URL) address of the online electronic map (e.g. Google Maps), such that the URL address filled in with the location information may be selected to connect a website. In this example, the graphical location information shared by the user may be, for example, an online electronic map of a specific location or specific area searched by the user.

Then, the mobile device insert the URL address with the location information into the document in, for example, an e-mail format, a short message service (SMS) format, a multimedia messaging service (MMS) format, a keyhole markup language (KML) format, a KMZ format, a hypertext markup language (HTML) format, or a special format like a vCard-like format (a format similar to a vCard format), and then transmit the document to the remote device. Accordingly, after the remote device receives the document, the remote device may automatically connect the URL address on the internet by reading the URL address inserted in the document, and display the online electronic map originally shared by the user of the mobile device.

Figure 3:
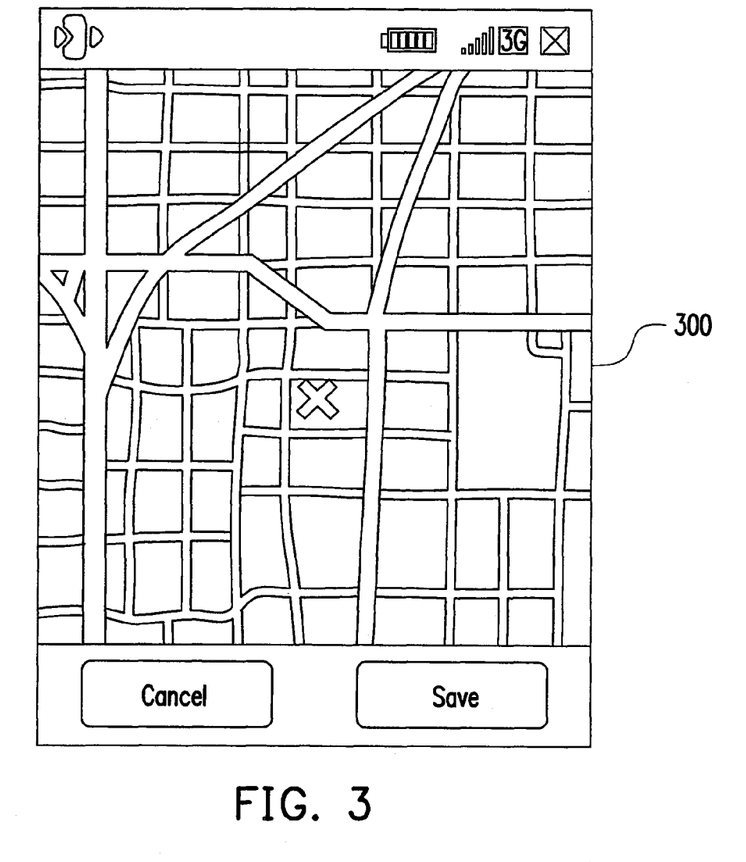
FIG. 3 exemplifies a online electronic map according to one example of the present application.

According to another example, if a remote device is equipped with an internet browser, a mobile device may connect the internet by its own browser according to the location information in the graphic location information (e.g. a longitude and latitude of some POI) and then search and open a corresponding online electronic map (e.g. an online electronic map 300 shown by FIG. 3) according to the longitude and latitude. After that, the mobile device may save the online electronic map as a single document in an HTML format and transmit the document to the remote device. Accordingly, after the remote device receives the document, the remote device may activate the browser to open the HTML file and display the online electronic map originally shared by the user of the mobile device (the same as FIG. 3).

By the foregoing way of inserting the longitude and latitude, the address, and the URL address into the document, or directly saving the online electronic map as the HTML file, the user of the remote device only needs to select the document to view the graphic location information originally shared by the user of the mobile device, no matter the remote device supports the display software of the mobile device of the user or not.

In another example, if the remote device can open multimedia files, the mobile device may also produce the multimedia document in a postcard format or style and fill the graphic location information in the postcard format documents for users' view, thereby achieving the same purpose of sharing the location information. Another example is described in detail hereinafter.

Figure 4:
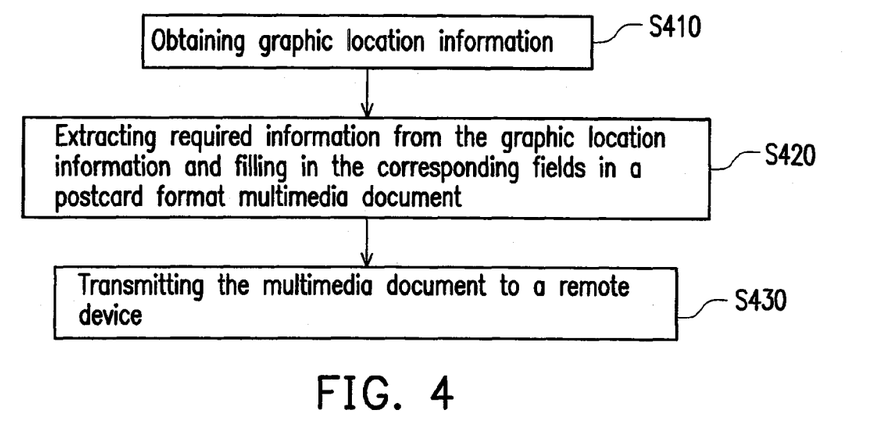
FIG. 4 is a flowchart illustrating a method for sharing location information according to one example of the present application.

FIG. 4 is a flowchart illustrating a method for sharing location information according to one example of the present application. Referring to FIG. 4, the example of the present application may be applied to mobile devices, such as a mobile phone, a smart phone, a PDA phone, a multimedia player, a game device, a navigation device, or a car PC, for sharing graphic location information of the mobile devices with a remote device, such that the receiver of the remote device may view the shared graphic location information. The method comprises steps as follows.

First, a display software is used to obtain the graphic location information (step S410). Next, required information (e.g. a name, a longitude and latitude, an address, a telephone number, a photo, a date of the photo being taken, time, or a rating of a POI) is extracted from the graphic location information and filled in the corresponding fields in a postcard format multimedia document (step S420). The multimedia document may comprise an MMS message, a JPEG file, KMZ, e-mail or an HTML file, and the present example is not intended to limit the scope thereof.

Then, the multimedia document is transmitted to the remote device (step S430). After the remote device receives the multimedia document, the remote device opens the multimedia document and displays the graphic location information, originally shared by the user of the mobile device, in the postcard format.

Figure 5:
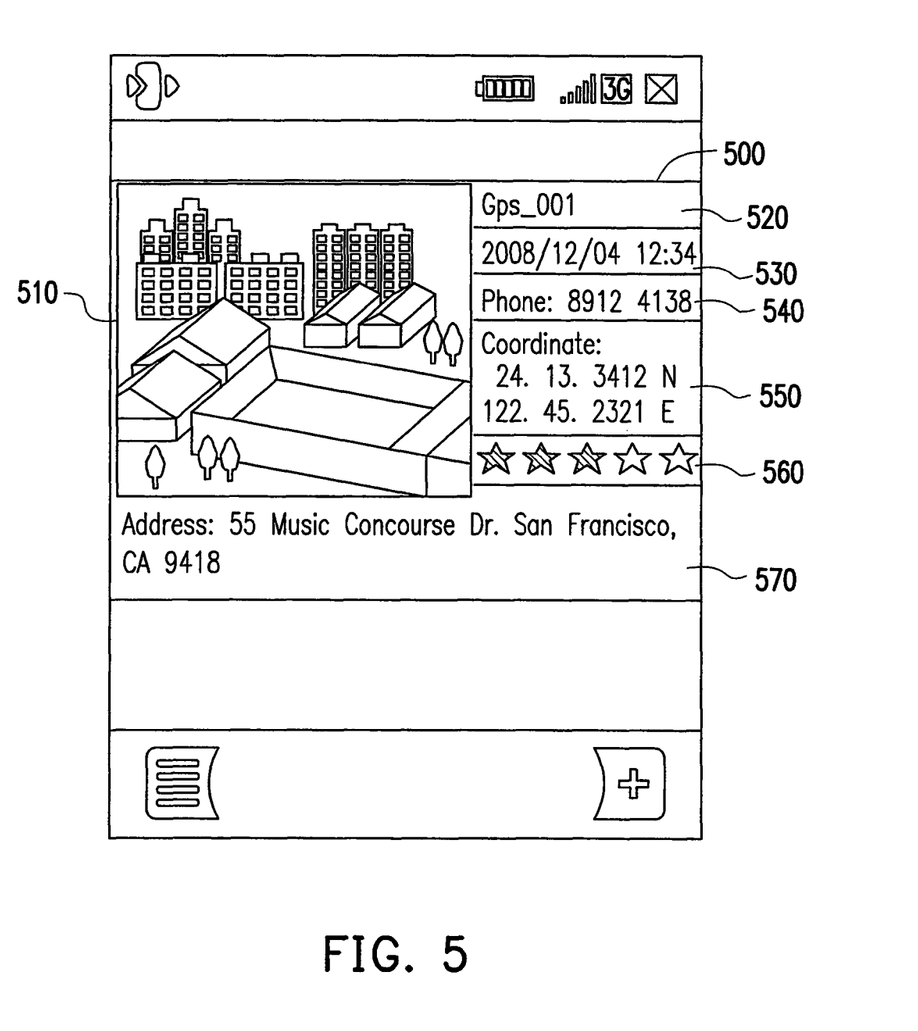
FIG. 5 exemplifies a multimedia document in a postcard format according to one example of the present application.

FIG. 5 exemplifies a multimedia document in a postcard format according to one example of the present application. Referring to FIG. 5, according to the present example, a multimedia document 500 is displayed in a postcard format or style, and in addition to a photo 510 on a left side in the postcard format, the multimedia document 500 also includes information of a POI, such as a name 520, a date and time 530 of a photo being taken, a telephone number 540, a longitude and latitude 550, a rating 560 (denoted with star symbols), and an address 570. When a user chooses to share graphic location information in a postcard format or style, a mobile device automatically extracts the aforesaid information from the original graphic location information and fills the aforesaid information in the corresponding fields in the postcard format multimedia document. Thereby, after the user of a remote device receives the multimedia document in the postcard format or style, the receiver may view all the graphical location information of the POI shared by the user without executing a particular display software.

In another example, in order for the remote device to recognize a format of the document transmitted by the mobile device, the method further comprises adding a tag to a header of the document in which the graphic location information is inserted to indicate the display software which can open the document. After the remote device receives the document, the remote device selects the applicable display software to open the document by reading the tag in the header, and displays the graphic location information on the remote device.

The present application also provides hardware devices for the aforesaid method of sharing location information, such that the method may be applied to the mobile devices such as a mobile phone, a smart phone, a PDA phone, a multimedia player, a game device, a navigation device, or a car PC. Another example is described in detail hereinafter.

Figure 6:
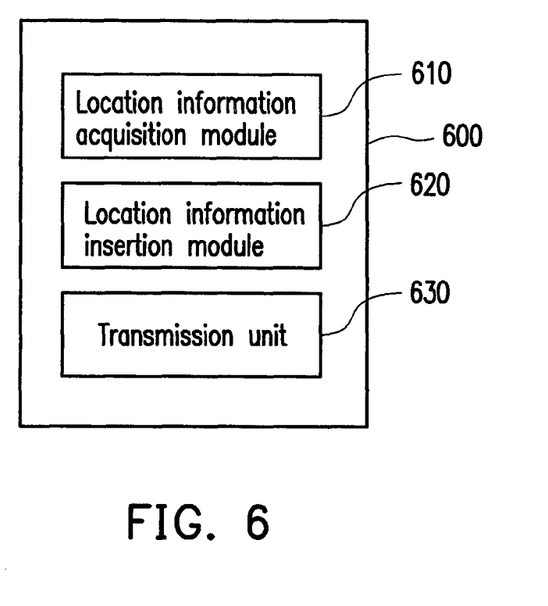
FIG. 6 is a block diagram illustrating a system for sharing location information according to one example of the present application.

FIG. 6 is a block diagram illustrating a system for sharing location information according to one example of the present application. Referring to FIG. 6, a system 600 for sharing the location information is adapted to be disposed in mobile devices such as a mobile phone, a smart phone, a PDA phone, a multimedia player, a game device, a navigation device, or a car PC. The system 600 comprises a location information acquisition module 610, a location information insertion module 620, and a transmitting unit 630, and the functions thereof are described as follows.

The location information acquisition module 610 obtains graphic location information by a first display software. The graphic location information comprises, for example, information of a POI, comprising a name, a longitude and latitude, an address, a telephone number, a photo, a date of the photo being taken, time, a text file, an audio file, a video file, a rating, etc.

The location information insertion module 620 is used to select a document corresponding to a second display software to insert into the document the graphic location information obtained by the location information acquisition module 610. A format of the document comprises an e-mail format, a SMS format, a MMS format, a KML format, a KMZ format, an image file format (e.g. a JPEG file), a HTML format, or a vCard-like format, etc.

The transmission unit 630 is, for example, a Global System for Mobile communication (GSM) system, a Personal Handy-phone System (PHS), a Code Division Multiple Access (CDMA) system, a Wide band Code Division Multiple Access (WCDMA) system, a Time Division—Synchronous Code Division Multiple Access (TD-SCDMA) system, a Wireless Fidelity (Wi-Fi) system, a Worldwide interoperability of Microwave Access (WiMAX) system, a radio repeater, or a radio broadcaster. The transmission unit 630 is used to transmit the document in which the graphic location information is inserted to a remote device.

In one example, the location information acquisition module 610 may use a reverse-geocoding method to convert the location information (e.g. a longitude and latitude) into an actual address, then the location information insertion module 620 inserts the actual address into the document, and after that, the transmission unit 630 transmits the document to the remote device. In one example, after the remote device receives the document, the receiver may directly read the actual address information. In another example, after the remote device receives the document, the remote device uses a geocoding method to convert the address in the document back to the longitude and latitude, and then, according to the longitude and latitude, connects the internet to display an online electronic map indicating a location of the longitude and latitude. Similarly, the location information acquisition module 610 may also use the geo-coding method to convert the actual address into the longitude and latitude, and then the location information insertion module 620 inserts the longitude and latitude into the document to transmit to the remote device.

Furthermore, in another example, by using a URL address generator, the system 600 for sharing the location information may fill the graphic location information in the corresponding fields in a URL address of an online electronic map (e.g. Google Maps), such that the URL address filled in with the location information may be selected to connect a website. After that, the location information insertion module 620 inserts the URL address into the document, and the transmission unit 630 transmits the document to the remote device. After the remote device receives the document, the remote device may automatically connect the URL address on the internet by reading the URL address inserted in the document, and display the online electronic map originally shared by a user of the mobile device.

Moreover, in still another example, according to the graphic location information, the location information acquisition module 610 may also connect the internet to open the online electronic map, the location information insertion module 620 may save the online electronic map as a single document in the HTML format, and then the transmission unit 630 transmits the document to the remote device. After the remote device receives the document, the remote device may activate a browser to open the HTML format file and display the online electronic map originally shared by the user of the mobile device.

It should be noted that, in response to the selected document format, the location information insertion module 620 further comprises adding a tag to a header of the document to indicate the display software which can open the document. Thereby, when the remote device receives the document transmitted by the transmission unit 630, by reading the tag in the header of the document, the remote device may select the applicable display software to open the document, and display the graphic location information on the remote device.

Except the aforesaid method of inserting the address and the URL address, or the method of saving as the single document in the HTML format, the present application may also display the graphic location information through producing a multimedia document in a postcard format or style. Another example is described in detail as follows.

Figure 7:
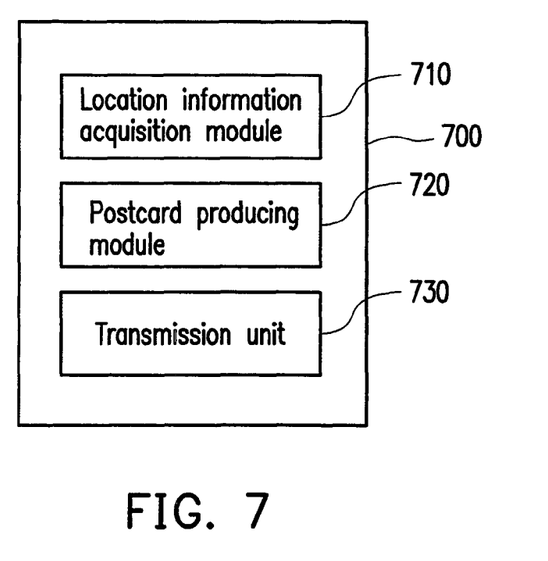
FIG. 7 is a block diagram illustrating a system for sharing location information according to one example of the present application.

FIG. 7 is a block diagram illustrating a system for sharing location information according to one example of the present application. Referring to FIG. 7, a system 700 for sharing location information is adapted to be disposed in mobile devices such as a mobile phone, a smart phone, a PDA phone, a multimedia player, a game device, a navigation device, or a car PC. The system 700 comprises a location information acquisition module 710, a postcard production module 720, and a transmitting unit 730, and the functions thereof are described as follows.

The location information acquisition module 710 obtains graphic location information by a first display software. The graphic location information comprises, for example, data of a POI, comprising a name, a longitude and latitude, an address, a telephone number, a photo, a date of the photo being taken, time, a text file, an audio file, a video file, a rating, etc.

The postcard production module 720 produces a multimedia document according to a postcard format, extracts required information in the graphic location information, and fills the required information in the fields in the postcard format. The multimedia document may comprise a MMS message, a JPEG file, a KMZ, an e-mail, or a HTML file, and the present example is not intended to limit the scope thereof.

The transmission unit 730 is, for example, a GSM system, a PHS, a CDMA system, a WCDMA system, a TD-SCDMA system, a Wi-Fi system, a WiMAX system, a radio repeater, or a radio broadcaster. The transmission unit 730 transmits the multimedia document in the postcard format to the remote device.

After the remote device receives the multimedia document transmitted from the transmission unit 630, the remote device opens the multimedia document and displays the graphic location information, originally shared by a user of a mobile device, in the postcard format. In one example, the remote device may open the multimedia document automatically after receives the multimedia document.

Figure 8:
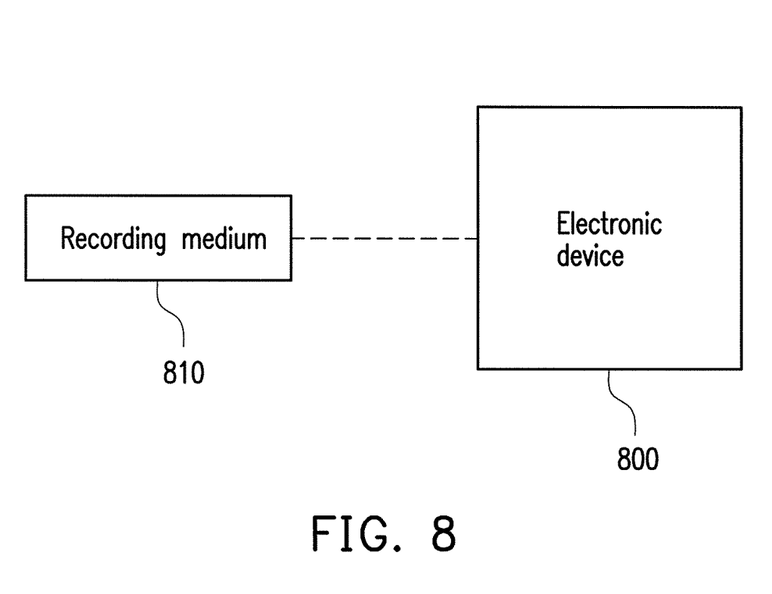
FIG. 8 is a schematic diagram illustrating an electronic device and a recording medium.

The present application further provides a recording medium for recording computer program instructions to be loaded into an electronic device for executing the method for sharing the location information. FIG. 8 is a schematic diagram illustrating an electronic device and a recording medium. Referring to FIG. 8, the program instructions recorded in a recording medium 810 are constituted by a plurality of program code segments (e.g. generating organizational diagram program code segment, endorsing sheet program code segment, configuration program code segment, and deployment program code segment), and after the program code segments are loaded in an electronic device 800 and executed, the steps of the method for sharing the location information are completed, and the functions of the system for sharing the location information are carried out.

In summary, the method and the system for sharing the location information and the recording medium using the same insert the graphic location information into the document which can be opened by the remote device and then transmit the document to the remote device so as to enable the user of the remote device to view the graphic location information originally shared by the user of the mobile device even when the remote device is not installed with the display software. Furthermore, the present application comprises making the graphic location information as a multimedia document in the postcard format. Thereby, the user of the remote device only needs to open the multimedia document to view all the graphic location information shared by the user of the mobile device in the postcard at one glance.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A method for sharing location information, for enabling a mobile device to share graphic location information with a remote device, the method comprising steps as follows:

obtaining the graphic location information by a first display software, wherein the first display software integrates a photo of a point of interest (POI) and related information of the POI into a POI collection, each page in the POI collection represents one POI, and one page in the POI collection comprises the graphic location information, wherein the graphic location information comprises a name, an address and the photo of the POI, and at least the name and the photo of the POI are displayed on the page of the POI in the POI collection;

inserting the graphic location information into a document corresponding to a second display software, wherein the second display software is different from the first display software, and the second display software is installed in the remote device; and transmitting the document to the remote device.

2. The method according to claim 1, wherein the method further comprises:

receiving an operation for adding a new POI; and adding a new POI page for the new added POI into the POI collection.

3. The method according to claim 1, wherein the graphical location information further comprises a longitude and latitude information for the remote device to connect the internet to display an online electronic map indicating the location of the longitude and latitude, and the step of inserting the graphic location information into the document corresponding to the second display software comprises:

using a reverse-geocoding method to convert longitude and latitude of the graphic location information into an address; and inserting the address into the document.

4. The method according to claim 1, wherein the step of inserting the graphic location information into the document corresponding to the second display software comprises:

filling the location information in the corresponding fields in a uniform resource locator (URL) address of an online electronic map; and inserting the URL address into the document, wherein the document is used for the remote device to read and connect the URL address on the internet and display the online electronic map.

5. The method according to claim 1, wherein the step of inserting the graphic location information into the document corresponding to the second display software comprises:
opening an online electronic map according to the graphic location information;
saving the online electronic map as a single document; and
inserting the single document into the document.

6. The method according to claim 1, wherein the step of inserting the graphic location information into the document corresponding to the second display software comprises:
producing a multimedia document according to a postcard format; and
correspondingly filling the graphic location information in the corresponding fields in the postcard format.

7. A non-transitory recording medium, recording program instructions for execution by a processor to perform:
obtaining the graphic location information by a first display software, wherein the first display software integrates a photo of a point of interest (POI) and related information of the POI into a POI collection, each page in the POI collection represents one POI, and one page in the POI collection comprises the graphic location information, wherein the graphic location information comprises a name, an address and the photo of the POI, and at least the name and the photo of the POI are displayed on the page of the POI in the POI collection;
inserting the graphic location information into a document corresponding to a second display software, wherein the second display software is different from the first display software, and the second display software is installed in a remote device; and
transmitting the document to the remote device.

8. A system for sharing location information, being disposed in a mobile device, the system comprising:
a location information acquisition module, using a first display software to acquire graphic location information, wherein the first display software integrates a photo of a point of interest (POI) and related information of the POI into a POI collection, each page in the POI collection represents one POI, and one page in the POI collection comprises the graphic location information, wherein the graphic location information comprises a name, an address and the photo of the POI, and at least the name and the photo of the POI are displayed on the page of the POI in the POI collection;
a location information insertion module, selecting a document corresponding to a second display software to insert the graphic location information into the document, wherein the second display software is different from the first display software, and the second display software is installed in a remote device; and
a transmitting unit, transmitting the document in which the graphic location information is inserted to the remote device.

9. The system according to claim 8, wherein the graphical location information further comprises a longitude and latitude information for the remote device to connect the internet to display an online electronic map indicating the location of the longitude and latitude, and the location information insertion module is further configured to use a reverse-geocoding method to convert longitude and latitude of the graphic location information into an address and insert the address into the document.

10. The system according to claim 8, further comprising:
a URL address generator, filling the location information in the corresponding fields in a URL address of an online electronic map; and
wherein the location information insertion module further comprises inserting the URL address into the document.

11. The system according to claim 8, wherein the location information acquisition module further comprises opening an online electronic map according to the graphic location information, and the location information insertion module further comprises saving the online electronic map as a single document,
wherein the location information insertion module is further configured to insert the single document into the document.

12. The system according to claim 8, further comprising:
a postcard production module, producing a multimedia document according to a postcard format and filling the graphic location information in the corresponding fields in the postcard format.

13. The system according to claim 8, wherein the location information insertion module further comprises adding a tag to a header of the document for indicating the second display software which can open the document.

14. The system according to claim 8, wherein the graphic location information comprises data of the POI, comprising any of a longitude and latitude, a telephone number, a date of the photo being taken, a map image, time, a text file, an audio file, a video file, and a rating, or a combination thereof.

15. The system according to claim 8, wherein the format of the file comprises an e-mail format, a SMS format, a MMS format, a KML format, a KMZ format, an image file format, a HTML format, or a vCard-like format.

16. A method for sharing location information, for enabling a mobile device to share graphic location information with a remote device, the method comprising:
obtaining the graphic location information by a first display software, wherein the first display software integrates a photo of a point of interest (POI) and related information of the POI into a POI collection, each page in the POI collection represents one POI, and one page in the POI collection comprises the graphic location information, wherein the graphic location information comprises a name, an address and the photo of the POI, and at least the name and the photo of the POI are displayed on the page of the POI in the POI collection;
producing a multimedia document according to a postcard format and filling the graphic location information in the corresponding fields in the postcard format, wherein the multimedia document corresponding to a second display software, the second display software is different from the first display software, and the second display software is installed in the remote device; and
transmitting the multimedia document to the remote device.

17. A non-transitory recording medium, recording program instructions for execution by a processor to perform:
obtaining graphic location information by a first display software, wherein the first display software integrates a photo of a point of interest (POI) and related information of the POI into a POI collection, each page in the POI collection represents one POI, and one page in the POI collection comprises the graphic location information, wherein the graphic location information comprises a name, an address and the photo of the POI, and at least the name and the photo of the POI are displayed on the page of the POI in the POI collection;

producing a multimedia document according to a postcard format and filling the graphic location information in the corresponding fields in the postcard format, wherein the multimedia document corresponding to a second display software, the second display software is different from the first display software, and the second display software is installed in a remote device; and transmitting the multimedia document to the remote device.

18. A system for sharing location information, comprising:

a location information acquisition module, obtaining graphic location information by a first display software, wherein the first display software integrates a photo of a point of interest (POI) and related information of the POI into a POI collection, each page in the POI collection represents one POI, and one page in the POI collection comprises the graphic location information, wherein the graphic location information comprises a name, an address and the photo of the POI, and at least the name and the photo of the POI are displayed on the page of the POI in the POI collection;

a postcard production module, producing a multimedia document according to a postcard format and filling the graphic location information in the corresponding fields in the postcard format, wherein the multimedia document corresponding to a second display software, the second display software is different from the first display software, and the second display software is installed in a remote device; and a transmitting unit, transmitting the multimedia document to the remote device.

19. The system according to claim 18, wherein the multimedia document comprises a MMS message format document, an image file format document, or a HTML format document.

20. The system according to claim 18, wherein the multimedia document is be opened and displayed by the remote device in the postcard format, and wherein the postcard format comprises the plurality of fields filled in with the graphic location information.

* * * * *